United States Patent
Kobland

(10) Patent No.: US 9,426,964 B2
(45) Date of Patent: Aug. 30, 2016

(54) COMPOSITIONS OF FINE FESCUE GRASSES FOR USE AS TURF IN AIRFIELD MANAGEMENT

(71) Applicant: Christina Kobland, Lafayette Hill, PA (US)

(72) Inventor: Christina Kobland, Lafayette Hill, PA (US)

( * ) Notice: Subject to any disclaimer, the term of this patent is extended or adjusted under 35 U.S.C. 154(b) by 83 days.

(21) Appl. No.: 14/334,361

(22) Filed: Jul. 17, 2014

(65) Prior Publication Data

US 2015/0033419 A1    Jan. 29, 2015

Related U.S. Application Data

(63) Continuation of application No. 13/409,362, filed on Mar. 1, 2012, now Pat. No. 8,789,310.

(51) Int. Cl.
*A01H 5/00* (2006.01)
*A01H 1/02* (2006.01)
*A01H 5/12* (2006.01)
*A01G 1/00* (2006.01)

(52) U.S. Cl.
CPC .................. *A01H 5/12* (2013.01); *A01G 1/002* (2013.01)

(58) Field of Classification Search
CPC .................................. A01H 5/12; A01G 1/00
USPC .............................. 435/420; 47/58; 111/200
See application file for complete search history.

(56) References Cited

PUBLICATIONS

Reaves et al. Alternatives to the Great American Lawn. Sep. 2006.*
Dernoeden Establishing an maintening fescues for low maintenance sites. University of Maryland Turfgrass Technical Update Oct. 2003.*
Saha et al. Occurrence and Significance of Endophytic Fungi in the fine fescues. The American Phytopathological Society 1987.*

* cited by examiner

*Primary Examiner* — Annette Para
(74) *Attorney, Agent, or Firm* — Gary P. Topolosky

(57) ABSTRACT

A composition suitable for airfield management comprises fine fescue grasses that result in environmental benefits, including protection of human life and wildlife; decreased mowing, to deeper and larger root systems and tremendous financial savings. One preferred version includes: (a) about 25-50% by weight Hard Fescue; (b) about 25-50% by weight Creeping Red Fescue; and (c) about 25-50% by weight Chewings Fescue.

12 Claims, 4 Drawing Sheets

COMPOSITIONS OF FINE FESCUE GRASSES FOR USE AS TURF IN AIRFIELD MANAGEMENT

CROSS-REFERENCE TO RELATED APPLICATIONS

This application is a continuation of application Ser. No. 13/409,362, filed on Mar. 1, 2012, which will issue on Jul. 29, 2014 as U.S. Pat. No. 8,789,310, and which claimed the benefit of prior-filed U.S. Provisional Patent Application Ser. No. 61/447,909, filed on Mar. 1, 2011, the subject matter of both being incorporated by reference in their entirety herein.

FEDERALLY SPONSORED RESEARCH OR DEVELOPMENT STATEMENT

The present invention was not developed with the use of any Federal Funds, but was developed independently by the inventors.

FIELD OF THE INVENTION

The field of the present invention relates to methods of improved management of airfield grasses, including areas both inside and outside of airport operation. More particularly, the invention relates to the use of selected seed mixes of fine fescue in order to reduce both the amount of mowing and the presence of wildlife resulting in major environmental, economic and safety benefits. The invention also relates to methods of improved management of roadsides, utility transmission corridor rights-of-way, golf courses, parks, campuses, cemeteries and other low traffic areas where low maintenance, short turf grass and wildlife control are desirable.

BACKGROUND OF THE INVENTION

An aerodrome, (or airdrome) or airfield is a term for any location from which aircraft flight operations take place, regardless of whether they involve cargo, passengers or neither. The terms are used in International Civil Aviation Organization (ICAO) documents, for example in the Annex to the ICAO Convention about aerodromes, their physical characteristics and their operation. The term "airport" is also used in the aviation industry. There is not a clear difference in meaning between the two terms in colloquial usage; however, the term airport may imply a certain stature (having satisfied certain certification criteria or regulatory requirements) that an aerodrome proper may not have achieved. That is to say, all airports are aerodromes, but not all aerodromes are airports. As used herein, the terms "airport", "airfield", or "aerodrome" shall be used interchangeably within the meaning of the invention.

Airports are divided into landside and airside areas. "Landside" land is airport land that is outside of the runway areas within the airport. Landside areas include parking lots, public transportation train stations, tank farms, grassy areas, mowed turf, access roads and areas along highways near airports. "Airside" land usually refers to land alongside of runways within the airport. Airside areas include all areas accessible to aircraft, including runways, taxiways, ramps and tank farms. Access from landside areas to airside areas is tightly controlled at most airports. Passengers on commercial flights access airside areas through terminals, where they can purchase tickets, clear security, check or claim luggage and board aircraft through gates. The waiting areas which provide passenger access to aircraft are typically called concourses, although this term is often used interchangeably with terminal.

A lawn is an area of aesthetic and recreational land planted with grasses or other low durable plants, which usually are maintained at a lower and consistent height. In recreational contexts, the specialized names turf, pitch, field or green may be used, depending on the use of the field and the continent. Many different species of grass are used, depending on the intended use and the climate. For example, coarse grasses are used where active sports are played, and finer grasses for ornamental lawns looked upon. Some grasses adapted to oceanic climates with cooler summers and others to tropical and continental climates with hotter summers. Often a mix grass or low plant types is used to form a stronger lawn when one type does better in the warmer seasons and the other in the cooler climates.

According to a study from the University of Illinois and report entitled Species, Endophytes and Wildlife—A Primer on Turf Management for Airports, by Bruce Branham, Theresa Kissane, and Edwin Herricks, (Departments of NRES and CEE, University of Illinois, it is estimated that since 1988, global wildlife strikes have been responsible for at least 163 aircraft strikes and resulted in the death of more than 194 people.

The FAA wildlife strike database has recorded over 121,000 (Civil and USAF) wildlife strikes between 1990 and 2010. During the five years between 2006 to 2010, there was an average of 26 strikes reported each day. As global travel increases every year, it is estimated that the number of strikes increases accordingly. Most alarming is that the FAA estimates that only 20% of wildlife strikes are reported.

Branham et al. report that birds were involved in 97.5% of the strikes. The reported strikes increased from 1,744 in 1990 to 7,236 in 2005. From 1990 to 2005, 695 strikes involved deer, and 79 involved reptiles. The white-tailed deer population has increased from 0.3 million in 1900 to 17 million in 2005. From 1980 to 2005, the resident Canada goose population has risen 7.9% each year. Over the same time period, the population of the red-tailed hawks increased 1.9%; the population of wild turkeys increased 12.7%; the population of turkey vultures increased 2.2%; and the population of double-crested cormorants increased 4.9%. FIG. 1 illustrates the incidents of wildlife strikes from 1990 to 2005, Table 1 demonstrates the recorded statistics of the states with the most reported wildlife strikes. FIG. 2 is a graphic representation illustrating the time of year when most wildlife strikes occur in the United States.

TABLE 1

States with the Most Reported Bird Strikes, 1990-2005

| STATE | NUMBER OF STRIKES |
|---|---|
| California | 5590 |
| Florida | 4447 |
| Texas | 4245 |
| New York | 3632 |
| Illinois | 3139 |
| Pennsylvania | 2335 |
| Ohio | 2119 |

Deterring birds from water on or near airports is an important part of many bird strike reduction programs. The FAA has made a significant effort of deterring birds from the ponds and waterways near airports. Overhead wires made with various materials and in a variety of patterns can reduce bird use of such areas, although the costs of such efforts can be substantial. As part of a study to determine whether increasing the spacing of grid wires reduces material and initial labor costs while still deterring birds, NRWRC researchers placed lines 50-feet apart over wastewater ponds in South Carolina and monitored bird usage. The total number of waterfowl using the ponds increased. Canada goose numbers declined, while mallard, ring-necked, and ruddy duck numbers increased.

The National Wildlife Research Center (NRWRC) conducts research to develop methods and provide guidance to the Federal Aviation Administration (FAA), airport operators, and the American public regarding the mitigation of bird-aircraft strike hazards. NRWRC has focused its research on understanding the nature of wildlife hazards at airports, developing management tools to reduce those hazards, and providing Wildlife Services' biologists, airport personnel, and FAA officials with information on the latest strategies for controlling wildlife hazards.

In a NRWRC study in Illinois, lines 15-feet apart over narrow streams in the State also showed no significant difference in total bird use before and after line installation. Mallards, great blue herons, and great egrets all used the protected areas. Waterfowl using the protected areas might have perceived the overhead lines as protection from avian predators. These findings show that an integrated approach is necessary to haze birds effectively at protected locations.

Understanding how birds perceive and react to deterrent methods is important for controlling property damage and protecting human health and safety, as well as preserving the aesthetic value of places shared by birds and people. In a recent study, NRWRC researchers investigated the reaction of captive brown-headed cowbirds (*Molothrus ater*) and rock pigeons (*Columba livia*) to a perching deterrent that caused slight pain and the reaction of Canada geese (*Branta canadensis*) to an area deterrent designed to provoke a fear response. Objectives of the study were to determine (1) the efficacy of these two techniques, (2) the latency of each technique, (3) if members of a flock would communicate the apparent risk among themselves and to naive flock members, and (4) if the birds would habituate to the techniques. The results of this study showed that both methods, when activated, were effective in displacing birds. With each method, each bird had to experience the technique, as video observations showed no evidence of communication among flock members or to naive birds that were introduced to the flock. However, when researchers deactivated each method after an initial period of activation, birds returned to the protected areas. No habituation to either technique was observed. NRWRC proposes that these results indicate that the loss of comfort due to direct pain or the perception of risk due to chronic random stimulus remains a critical component in stimulating bird avoidance behavior.

Another current means of "wildlife management" at airports refers to the practice of employing sharpshooters to kill any animal or bird that is located on airport property or vicinity.

In 2009, following the USAir 1549 bird strike and emergency landing in the Hudson River, the FAA started a number of initiatives to mitigate bird and wildlife strikes by airplanes. The FAA made its entire bird strike database available to the public. Over the last three years the FAA has received 21,489 strike reports—7,545 strikes in 2008; 9,484 in 2009; and 4,460 through July 2010.

The FAA issued a certification alert to airport operators on Jun. 11, 2009, reminding them of their obligation under the FAA regulations to conduct mandatory Wildlife Hazard Assessments and the FAA provides Airport Improvement Program funds for assessments and for the development of a follow-up Wildlife Hazard Management Plan, if needed.

The FAA also has a working relationship with the Smithsonian that goes back to the 1960s, when the two agencies, along with the military and aircraft manufacturers, began working together to identify the bird species from remains after a strike. Bird identification helps airfield personnel implement habitat management schemes that discourage birds from airfields and provides information so aircraft manufacturers can better design engines and aircraft to withstand the impact of bird collisions.

In 2001, the FAA began working with the United States Air Force to develop a radar system for detecting and tracking birds on or near airports. Because of the rapid development of avian radar, the FAA switched its research focus and began evaluating commercially available avian radar. Specifically, the FAA wanted to know how airport operators could use the technology to help implement their wildlife hazard mitigation programs.

For the last 15 years, the FAA and the United States Department of Agriculture (USDA) have conducted a research program to make airports safer by reducing the risks of aircraft-wildlife collisions. The research efforts designed to improve wildlife management techniques and practices on and near airports include methods for making airport habitats less attractive to species that are the most dangerous in terms of aircraft collisions. This is accomplished by studying which species use the airport property, how they behave in that environment, and why they are attracted; techniques for controlling species by restricting access to attractive features like storm water ponds; and technologies for harassing and deterring hazardous species.

The FAA cosponsors the Bird Strike Committee-USA as part of its continued public outreach and education effort to increase awareness within the aviation community about wildlife hazards. This is an international forum where biologists, engineers, airline personnel, and others come together to exchange ideas and learn about the latest technology to mitigate wildlife hazards.

The tremendous focus, effort, research, studies and current wildlife deterrent techniques clearly illustrates that there exists a great need for a safe, effective and sustainable method of deterrence to wildlife at airports. The current invention introduces a turf management strategy described herein that makes great progress into addressing this continuing need.

In most airport protocol, the field is composed of existing weedy turf grass vegetation requiring regular mowing. Existing turf grass installations are input intensive, requiring high levels of labor and materials such as mowing, equipment, chemicals and fertilizers (for example, petrocarbons), water, and energy, which are required in order to properly maintain the airport runways and surrounding areas. Hence, in addition to being wildlife attractants, existing airfields can be environmentally destructive—contributing to massive overloads of storm water runoff, pollution of our waterways and oceans, depletion of groundwater supplies, and additional green house gas emissions.

Existing airport turf grass installations typically include known wildlife attractants such as bluegrass, rye grass and broadleaf annual and perennial weeds, which are problematic in that they are attractants to grazing wildlife, such as geese, deer, and grasshoppers, all of which are especially troublesome for airports. Other problematic animals include (but are not limited to) rabbits, mice and other rodents, squirrels, groundhogs, as well as many other species of birds. Predators such as fox, coyote, and hawks are attracted to the lower trophic levels of animals, including insects, which are attracted to the typical weedy turf grass of airfields. These animals are all hazardous to aircraft. The Federal Aviation Administration attempts to discourage wildlife from entering airside land by encouraging airports to specify less favorable landside habitat conditions as one extra layer of protection. The resulting environmental and economic impact demonstrates a currently unmet need in modern turf grass landscapes at airports.

At the 29th Meeting for Bird Strike Committee, Bill Walmsley discusses best practices for establishing endophyte grasses at airports. (2010 Best Practice Guidelines for Novel Endophyte Grass Establishment at Airports). The report, like others, discusses only tall fescues, ryegrasses and cool season turf grasses. Currently, tall fescues are used at some airports in an attempt to deter wildlife from the airfields. Other grasses commonly used for airport turf include Kentucky bluegrass as a cool season species and Zoysiagrass and buffalograss as warm season turf grass species.

AgResearch Ltd., New Zealand's largest Crown Research Institute, an independent state owned research and development company, investigated the use of endophytes in ryegrass and fescues for wildlife management, stating that the bird strikes cause a challenge of $1.5 billion to the aviation industry annually. Specifically, AgResearch Ltd. focused its study on two turf species of grass—Jackal, a tall fescue variety, and Colosseum, a ryegrass, which are now on the market through PGG Wrightson Seeds. The tall fescue was chosen for airfields and is being trialed at major airports in New Zealand. In May 2011, AgResearch and scientist Chris Pennell received the DuPont Innovation Award that recognizes the commercialization and outstanding science and technology in Australasia.

Despite the recent success and spreading popularization of tall fescues, the use of tall fescues does not resolve the various challenges of airfield management as discussed herein. The tall fescues can grow to heights of 48 inches or more, and therefore require steady mowing resulting in a great economic burden on airports which carries into greater costs of air travel to the consumer.

As the aviation industry is faced with potential for extensive loss of life and property due to wildlife strikes each year, the frequency and consequences of wildlife activity dictate that these occurrences remain in the forefront of every airport's wildlife management plan. Beyond the environmental, social and financial consequences of wildlife strikes, a report presented by Larry A. Dale at the Aug. 2008 USA/Canada Meeting of the Bird Strike Committee, goes further to outline the legal liability faced by airports and their management. In addition to federal and state policies, the court system has also become involved to ensure that airport management take steps to conduct accurate assessments and to develop and implement an effective wildlife management plan for wildlife hazard mitigation.

According to the invention, it is disclosed herein that fine fescues grass species can be used successfully according to the invention to replace existing typical airside and landside turf, which are often very weedy wildlife attractants that require continuous mowing at airports. Current airfield turf grass maintenance necessitates continuous mowing to maintain the grass at acceptable heights. Not only does the mowing flush and mutilate insects and small animals and produce straw, both of which attract hazardous wildlife to runway safety areas, but mowing also is an energy and labor intensive practice that inherently increases the potential for operational conflicts and safety risks with other ground equipment and aircraft on the airfield.

To date, with many national and global efforts to address the stated problems, it has not been known to address the combined features of wildlife deterrence and the need for reduced mowing resulting in improved airfield management and the benefits of improved storm water control, decreased pollution, decreased gas emissions, temperature moderation, biodiversity conservation and other safety, environmental and economic benefits disclosed herein. The invention utilizes fine fescues successfully grown on airfields in a manner never before appreciated and provides an operative result that had not been achieved heretofore.

SUMMARY OF THE INVENTION

Disclosed herein is an improved method of airfield management comprising growing fine fescue grasses on the airfield and maintaining them as monocultures free of weeds and other grasses. Weeds and other grasses serve as wildlife attractants and require regular mowing, the mowing process which itself serves as a wildlife attractant due to the disturbance it creates. Such method results in reducing wildlife grazing on the airfields, reducing the predators that are drawn to the grazers, and the insects that are diminished due to control of wildlife-attractant weeds and grasses, and reducing the maintenance required on airfields by the airports from an average 22 mows per year to one mow per year. The fine fescue grasses of the invention are selected from hard fescues, creeping red fescues, chewings fescues, slender creeping red fescue, and/or combinations, blends and mixes thereof. Also disclosed is a method of improved turf management comprising the steps of seeding and growing fine fescue grasses, and maintaining them as substantially weed-free monocultures to fulfill the two-fold goal of reduced mowing and wildlife deterrence.

BRIEF DESCRIPTION OF THE DRAWINGS

The foregoing summary and the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

DETAILED DESCRIPTION OF THE INVENTION

Figure 1:
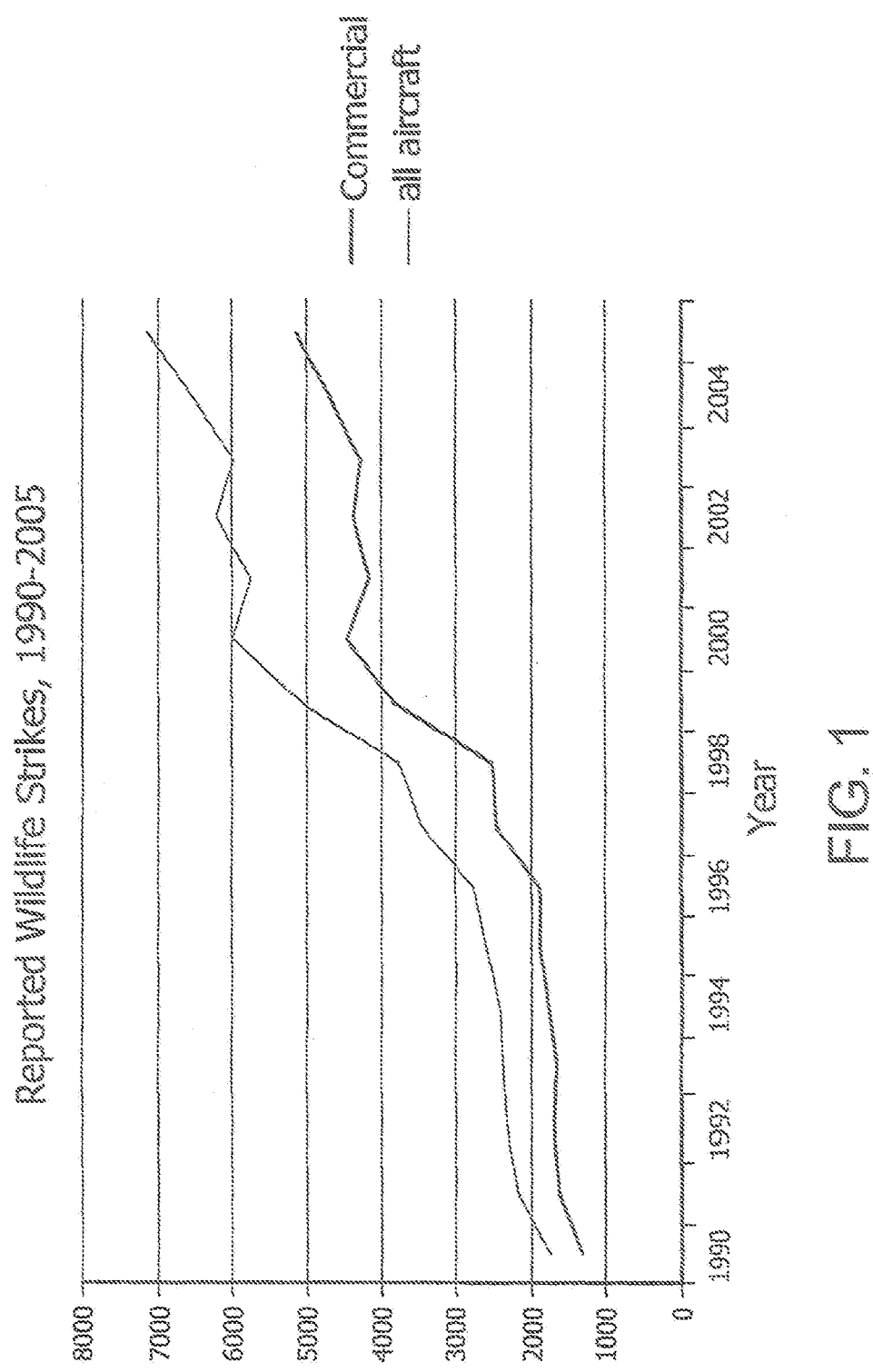
FIG. 1 is a graph showing the reported incidents of wildlife strikes in the United States, as recorded between the years of 1990 to 2005.
Figure 2:
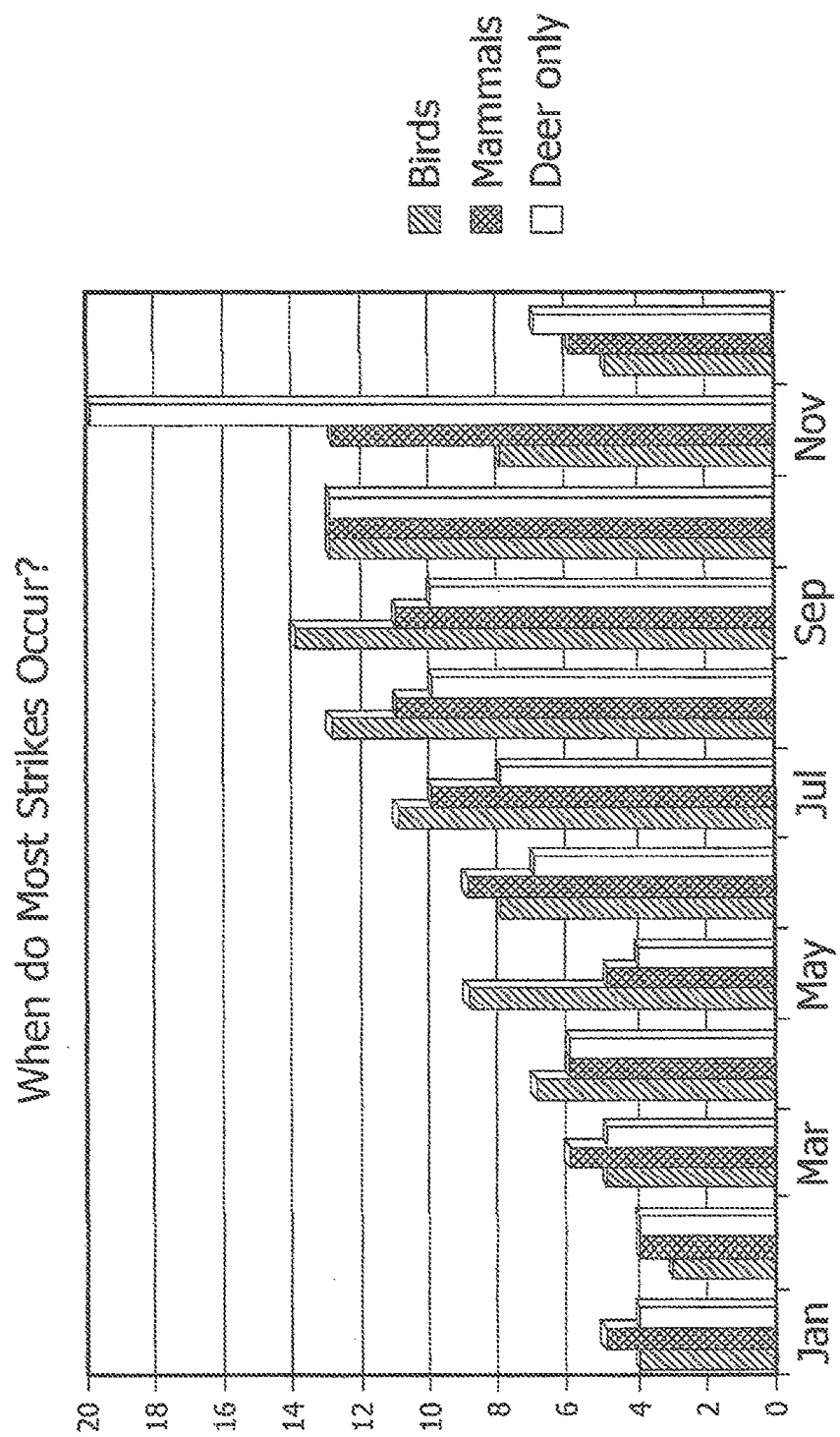
FIG. 2 is a graph showing the time of year when most wildlife strikes occur in the United States.

The embodiments of the current invention encompass a novel method of using existing short turf-type grasses, particularly fine fescues which have the two-fold effect of eliminating both the high maintenance aspect of turf management and the wildlife attractant feature. Despite recognition in the turf management field that endophytic grasses are desirable, the use of fine fescues is heretofore unknown in airfield management. Embodiments of the invention require little, if any, mowing, little, if any, fertilization or watering, and reduced chemicals, gasoline and alternate energy sources, and reduced labor. In certain embodiments of the invention, wildlife avoid eating the turf, possibly due to a naturally present or enhanced endophyte contained in the fine fescue mixture of the invention. The result is reduced maintenance, reduced cost, lower greenhouse gas emissions, and increased safety in areas where wildlife poses a threat to humans, protecting both people and wildlife.

The embodiments of the invention are directed to the use of fine fescue grasses for use in airfield applications. Fine fescue grasses include varieties such as, but not limited to, chewings fescue (*Festuca rubra* var. *conunutata*), creeping red fescue (*Festuca rubra* var. *rubra*), slender creeping red fescue (*Festuca rubra* var. *trichyophylla* and *Festuca rubra* var. *littoralis*) and hard fescue (*Festuca longifolia* and *Festuca brevipila*). The use of all species, subspecies, genus, cultivars, blends and mixes of fine fescue grasses are within the scope of this invention. As used herein based on common usage, a "blend" is a selection of several cultivars of the same species. A "mix" is the selection of more than one species. In the agricultural field, blends are often used to increase biodiversity. One preferred embodiment of the invention intended as a general purpose mix is a blend of different cultivars of fine fescue grasses only.

It is known that fine fescue grasses are appropriate for northern "cool" and "transitional" climates where annual rainfall is of about 25 inches or more, with at least half arriving during the growing season. Fine fescues are not recommended for wet soils, compacted soils, or poorly drained heavy clay soils. Fine fescue grasses usually thrive in full sun to partial shade on any reasonably well-drained soil, and are particularly well suited to growing on dry, sandy or rocky soils with low nitrogen levels. Fine fescues prefer a non-alkaline soil, or lower soil pH. Because fine fescues are cool season grasses, they are recommended for planting in northern and transitional climates of the United States and Canada (above approximately 37 degrees North latitude). They are also adapted to the coastal areas of the Pacific Northwest, the cooler mountain climates in the east-central states, and in the western mountains from the mid-elevation aspen woodlands to just below timberline. Chewings fescue is particularly tolerant of sandy, acidic, and infertile soils. Hard fescue is very cold hardy and low maintenance. A naturally short grass, it requires less frequent mowing. Creeping red fescue is used most widely, establishes early, and is the most aggressive creeper. Slender creeping red fescue is salt-tolerant.

The various varieties of existing fine fescues are often mixed, sold and utilized in blends with Kentucky bluegrass and perennial ryegrass in order to add greater shade, drought tolerance, and quicker establishment. However, it is preferred according to the invention not to combine the fine fescues with bluegrass or ryegrass for application on airfields because the bluegrass and ryegrass are wildlife attractants.

All fine fescue varieties are contemplated and included within the scope of the invention herein, including, but not limited to the following named varieties: 'Aurora', 'Bighorn', 'Claudia', 'Flyer', 'Ensylva', 'Longfellow', 'Longfellow II', 'Marker', 'Medallion', 'Reliant', 'Salem', 'Scaldis', 'Shademaster', 'Spartan', and 'Victory', 'Treasure II', 'Boreal', 'Spartan II', 'Intrigue 2', 'Zodiac', 'Navigator II', 'Beacon', 'Radar', 'Fairmont', 'PSG 50c3', 'Sword', 'Epic', 'Gotham', 'Lacrosse', 'IS-FRR-51', 'IS-FRR-62', 'IS-FRC-35', 'Cascade', 'Aberdeen', 'PST-4CSD', 'PST-4HES', 'Bighorn GT', Shademaster 'PSG-5RM', 'Pick FRC A-93', 'Treazure', 'PST-4HM', 'ACF 092', 'Shadow II', 'Tiffany', 'Jamestown II', 'Magic', 'ABT-CHW-1', 'Pick FRC4-92', 'Brittany', 'Ambassador', 'ABT-CHW-2', 'SR 5100', 'Banner II', 'ACF 083', 'Bridgeport', 'BAR CHF 8 FUST, 'MB-63', 'Culombra', 'Sandpiper', 'ISI FRR7', 'ISI FRR5', 'ASC 082', 'JASPER SRX 52961', PST-EFL', 'Path Finder', 'Shade Mark', 'ABT-CR-3', 'PST-47TCR', 'DGSC 94', 'ABT-CR-2', 'Florentine', 'SRX 52 LAV', 'PST-4FR', 'ASC 172', 'ASC 087', 'Salsa', 'BAR CF8 FUS1', 'Shademaster II', 'Common Creeper', 'Boreal', 'Dawson E+', 'ASR 049', 'BAR SCF 8 FUSS', 'Seabreeze', 'AHF 009', 'ISI FL 12', 'Heron', 'ISI FL 11', 'Attila E', 'ABT-HF1', '4001, SRX 3961', 'Osprey', 'Rescue 911', 'Oxford', 'MB-82', 'AHF 008', 'ABT-HF-2', 'Pick FF A-97', 'Bighorn', 'ABT-HF4', 'ABT-HF3', 'Nordic', 'Discovery', 'Reliant II', 'DeFiant', 'BAR HF 8 FUS', 'Minataur', 'SR 3200', 'PST-4 MB', 'SR 6000', 'QUATRO', 'Firefly', 'Rhino', 'Chariot', 'Beacon', 'Gotham', 'Predator, 'Bershire', SR3000', 'Viking', SR 3150', 'Eureka', 'Aurora Gold', 'Berkshire', 'Epic', 'LaCross', '7 Seas', 'Spartan II', 'Wendy Jean', 'Zodiac', 'Aurora II', 'Intrigue', 'Edgewood', 'VNS', 'Triumph Lo Gro', 'Seabreeze GT', 'Fotitude', 'Dawson E', 'Cardinal', 'BMXC-502', 'C-SMX', 'Compass', 'Celestial', 'DP 77-9885', 'DLF-RCM', 'Garnet', 'J-5', 'Musiva', 'CO3-4676', 'Classono', 'IS-FRR 23', 'Jasper II', 'Lacrosse', 'Razor', 'Shademaster', 'Cascade', 'DP 77-9360', 'DP-77-9578', 'Oracle', 'Pathfinder', 'Shoreline', 'Splendor', 'TL1', 'Zodiac', 'Ambassador', 'Culumbra II', 'DP 77-9579', 'Seabreeze', 'DP 77-9886', 'PST-8000', 'Reliant IV', 'Treazure II', 'Audobon', 'Berkshire', 'Oxford', 'Predator', 'SR 3000', 'SRX 3K', 'Scaldis', 'Rescue 911', 'Ecostar', 'Viking', 'Stonehenge', 'Miser SCR', 'Shaker', 'Sealink', 'Henry', 'Harpoon', 'Pennlawn', 'Frazer', 'Tiffany', 'ShadowII', 'Florentine GT', 'Jamestown 4', 'Sealink', 'Lowgro'.

According to the method of the invention, a mix with a larger variety of species can be selected, so that one or more will prevail. However, any blend or mix of fine fescue varieties is operable within the scope of the invention and any species of which can be planted alone or in combination with any other species. The following characteristics used to determine which fine fescue and percentages are appropriate include, but are not limited to: soil test results, site conditions, region, seed availability and level of endophytic activity, height of cultivar, and local conservation district or municipal requirements.

The "creeping" fescues include Creeping Red Fescue (*Festuca rubra* var. *rubra*) and Slender Creeping Red Fescue (*Festuca rubra* var. *trichyoplylla* and *Festuca rubra* var. *littoralis*). The "bunch forming" fescues include Hard Fescue (*Festuca longifolia* and *Festuca brevipila*) and Chewings Fescue (*Festuca rubra* var. *commutata*). The bunch fescues are exceptionally drought resistant, thrive in nitrogen poor soils, and have low to moderate tolerance to heavy foot traffic. The creeping fescues spread gradually by underground rhizomes to fill in areas between the bunch grasses to create a mono-stand of weed-resistant sod.

Hard Fescue (*Festuca longifolia* and *Festuca brevipila*): bunch grass; deep-rooted; most resistant to heat and drought of all the fine fescues; most tolerant of foot traffic of all the fine fescues; longer to establish; attractive; does not adapt to close mowing. Chewings Fescue (*Festuca rubra* var. *commutata*): bunch grass; deepest green of all fine fescues; most competitive, helping to crowd out weeds; thrives in acidic soils; more tolerant of close mowing than other fine fescues; does not stand up well to heavy foot traffic; prone to developing a thatch layer; spreads slowly by basal tillering; higher winter hardiness; is adapted to well-drained, coarse textured, acidic, infertile soils. Creeping Red Fescue (*Festuca rubra* var. *rubra*): creeping grass; helps to fill in areas that experience damage; drought resistant; requires little nitrogen; does not form dense thatch layer; has low tolerance to close mowing; and tends to be aggressive and quicker to establish. Slender Creeping Red Fescue (*Festuca rubra* var. *trichyoplylla* and *Festuca rubra* var. *littoralis*): creeping grass; high salt tolerance.

The especially noteworthy object of the invention is the minimization of the presence of wildlife, and wildlife grazing and predation at airports. When maintained as monocultures through the invention's concurrent weed control methods, the fine fescue blends and mixes useful in the invention are almost completely avoided by geese and other flocking and non-flocking birds, which greatly minimizes or prevents the highly dangerous commonplace occurrence of bird strikes by airplanes in the air regions around airports which sometimes lead to plane crashes or other complications to the airplanes. Problematic foraging wildlife like deer also do not prefer the grass blends and mixes of the invention. The invention confers a tremendous benefit of increased safety for animals and birds at airports. Thereby, the invention also increases protection both to the wildlife and to people in situations where the wildlife poses a threat to humans.

Though the mechanism of action is not necessary to practice the invention, it is thought that this benefit is conferred presumably by naturally occurring substances (defense mechanisms) in the plant material. Some such defense mechanisms include endophytes contained in the grass species. Endophytes are symbiotic fungi that live in certain grasses. About 20-30% of all grass species contain some endophytes. Grasses provide substrates necessary for endophyte growth. Many endophytes produce alkaloids, some of which are toxic to invertebrates and vertebrates. Also, endophyte infection has been shown to provide resistance to many foliar-feeding insects. Fine fescue typically contains *Epichloe festucae*. In turf grasses, transmission of endophytes is by seed and its entire life cycle takes place inside the plant tissue. A plant does not become infected from its neighbors, therefore a strand of uninfected variety will remain uninfected. According to the preferred embodiments of the invention, the seed mixtures utilized in the application to the desired airfield contain fine fescue grasses. In selecting the seed mixture according to the invention, fine fescues containing known higher levels of endophytic activity available at the time are preferably selected. The seeds should be fresh, preferably, but not necessarily, not more than 9 months old, and stored appropriately according to industry best practices.

Factors considered in designing the blends and mixes for use at airfields and surrounding areas according to the invention include the following. The seeds of the invention are preferably planted in fall at temperatures ranging between 45° F. to 80° F. Cool evening temperatures and gentle rains present ideal conditions. Fine fescue grasses are appropriate for northern "cool" and "transitional" climates where annual rainfall is of about 25 inches or more, with at least half arriving during the growing season. The plantings of the invention can be planted and grown in direct sunlight, since airfields are generally greatly exposed to the sun as well as the elements. The grasses of the invention can be planted on areas of any size at the airports. The conditions of the soil should be generally sandy, loamy, or well-drained clay soils with at least four inches of good, loose topsoil.

In creating an airfield according to the invention, the airfield site is prepared pursuant to the methods herein utilizing the seed blends and mixes of the invention that will result in minimal grazing by wildlife and low maintenance for the airport. As the first step of the operation of the invention, a soil test is performed. This will be typically performed by a university-affiliated agricultural extension service. The airfield site is first prepared according to standard industry practice or directions provided by the county extension service providing the soil test.

New installations on disturbed soil, including sloped sites, are hydro-seeded according to standard practice, except for the practices described herein. Any method of seeding is operable within the scope of the invention. For existing turf installations, all existing vegetation is eliminated prior to seeding with an appropriate herbicide approved by the Environmental Protection Agency (EPA), such as glyphosate, according to directions on the label. The process may need to be repeated a second time. After waiting two weeks, the growth is mowed as low as possible, exercising care to limit patches of thatch. It is preferred that crisscross back and forth mowing is performed by a flail-type mower to grind up the thatch, if necessary. The seed mixture of the invention is seeded at the recommended rate using a no-till or slit seeder. Typically this is the best method to limit exposure of the seed to wildlife and to ensure seed-to-soil contact.

According to the method of the invention, fertilizer is not recommended and should be applied sparingly, if at all. Fertilizers can be applied only in early spring or late summer as a slow-release and balanced fertilizer depending upon the soil test results. Nitrogen fertilizers are applied to stimulate leafy growth, which only increases the need for mowing. High nitrogen fertilizers that stimulate top growth, which requires mowing, should be avoided. The application of excessive nitrogen fertilizer can actually damage fine fescue grasses, so minimal or no fertilization is recommended for the method of the invention. The fine fescues of the invention will grow well in soils within a pH range of between 5.0 and 8.0. The optimum range is between 5.5 and 6.4, however within the method of the invention, once the grass is established, the pH is preferably kept below 6.2 to keep growth to a minimum.

Fine fescue grass forms dense sod that naturally reduces weed growth, minimizing the need for herbicides. If herbicides are needed, weeds can be treated with an EPA approved product carefully following the directions on the label. EPA approved herbicides will be necessary on an as needed basis in airfields or other installations where height is a concern to control tall fescues and other turf grasses and weedy growth that exceed the height of the fine fescue, which typically will be approximately 6 inches. This can be done by wicking the undesirable growth above the fine fescue, exercising care to avoid contact with the fine fescue, using standard wicking equipment and practices.

Geographical location and weather conditions will determine the best seeding time. Typically, between late August and late September or early October is preferred for the method of the invention. Further south, seeding can be extended into late October. Fewer weeds germinate in fall seeding. Seeding in March to mid-May is a second choice. Weeds will be more prevalent and may need to be treated.

According to the invention, the need for mowing will be significantly minimized or eliminated. If desired, the grass seedheads can be mowed to approximately 6 inches, as measured from the base of the grass blades at soil level to the top of the grass blades, when seed heads of the grass appear, usually in early June. (Seedheads can shoot up quickly to as tall as 21 inches but are not problematic because of their wispy appearance.) Mowing of the seedheads is recommended for airports to keep the runway signs and lights fully visible. It is most preferable not to mow closer than 4 to 6 inches, more preferably to approximately 5 inches from the base of the grass blades at soil level as this might damage the turf. A desirable procedure is to mow to the height of the existing grass blades, cutting only the seedheads themselves and not the grass blades. It is recommended that mowing be done with a flail-type mower that will chop any vegetation, as opposed to leaving a layer that will smother the growth below.

Geographic location, site conditions, seed availability, and local regulations will help in the choice of the seed mix and percentages. It is preferred to utilize a mix of more than one hard fescue and another chewings fescue and creeping red fescue in lesser amounts, in conjunction with the one or more hard fescue varieties. Slender creeping red fescue can be included as a creeper possessing high salt tolerance.

The grass blades of and seed blends of the invention alleviate any concerns of height restriction requirements of the Federal Aviation Administration and specific airport guidelines because the grasses of the invention remain very short throughout their growth and in the event that they are not mowed by airport maintenance, the blades of the grass tumble gently at approximately 5 to 7, more particularly at approximately 6 inches from ground level and prevent any height concerns. Seedheads develop over a short period in May or June and will be taller, but their wispy appearance generally will not be problematic. Fertilization procedures of the invention (meaning little if any fertilization) should be followed to limit the development of seedheads. Other local ordinances may be a factor in deciding on the particular species to be used. The State Department of Natural Resources outlines the guidelines regarding the species of plants that are permitted to be planted in specific jurisdictions.

The seeds of the current invention are typically seeded in the fall at a rate of between 180 to 260 lbs./acre, more preferably between 200 to 240 lbs./acre, and most preferably at approximately 220 lbs./acre. In the embodiment of the airfield herein, sections of the airfield are most preferably seeded in late August or early September. Less preferably they can be seeded through October, particularly in more temperate climates. Though not preferred, it is possible that the seeding be performed at other times of the year, since airports sometimes have no choice but to seed once grading is complete. Following the initial installation, the following late spring, when soil temperatures remain above 60° F., the weed cover within the turf stand is assessed. In areas further north, this may occur several weeks later in the season.

During initial establishment of the fine fescues according to the invention, it is important to identify the perennial broadleaf weeds and brush, and/or the annual broadleaf weeds. For small infestations of perennial broadleaf weeds or brush, the area is spot sprayed with an Environmental Protection Agency (EPA) approved selective herbicide. For a large infestation, a broadcast application of an EPA approved selective herbicide may be necessary, following the label instructions and manufacturer's recommendations for all herbicides applied, which will include the proper time to spray based on the weeds present. In the event of the presence of annual broadleaf weeds and annual grasses, the area is controlled according to the invention preferably in May or June by the annual mowing of the seedheads of the grasses of the invention. During the first year of their establishment, the grasses of the invention are mowed a second time if desired, no less than 4 to 6 inches, preferably 5 inches from the ground, which should be done preferably in August in order to reduce the seedheads of the annual weed vegetation. In order to prevent potential areas where the seeds or grass has not established or have been damaged, such areas are reseeded or overseeded, preferably in late August or early September, at a rate of between 180 to 260 lbs./acre, more preferably between 200 to 240 lbs./acre, and most preferably at approximately 220 lbs./acre, following initial installation instructions.

The grasses of the invention are mowed only once annually when seed heads approach maturity in the late spring (in May or June). Any techniques known in the industry for mowing are operable within the scope of the invention, but the use of a flail-type mower to mulch and cut the blades of the vegetation is preferred. The blades of the grasses herein are preferably cut to a height no less than 5 or 6 inches from the ground. Mowing on days when extreme heat and sun are forecast should be avoided.

Yet another benefit of the compositions and methods of the invention relate to the increase of storm water infiltration due to deeper root systems of the compositions of the invention. With its deeper and larger root systems, the compositions of the invention provide better soil stabilization than regularly mowed turf, which has shallow roots. The larger and deeper root systems are more effective in preventing erosion.

Yet another benefit of the compositions and methods of the invention is the reduction of harmful gas emissions to the atmosphere. The Environmental Protection Agency (EPA) estimates nationwide emissions of ambient air pollutants and the pollutants and their precursors. The estimates are based on actual monitored readings or engineering calculations of the amounts and types of pollutants emitted by vehicles, factories, and other sources. Emission estimates are based on many factors, including levels of industrial activity, technological developments, fuel consumption, vehicle miles traveled, and other activities that cause air pollution. Emissions information is developed with input from state and local air agencies, tribes, and industry. EPA tracks a range of emissions data, including how much of each pollutant is emitted from various pollution sources. The following are common air pollutants and their precursors: carbon monoxide (CO); lead (Pb); nitrogen oxides ($NO_x$); volatile organic compounds (VOC); direct $PM_{10}$ direct $PM_{2.5}$; and sulfur dioxide ($SO_2$). Emissions of air pollutants continue to play an important role in a number of air quality issues. In 2010, about 90 million tons of pollution were emitted into the atmosphere in the United States. These emissions mostly contribute to the formation of ozone and particles, the deposition of acids, and visibility impairment.

In addition to the environmental and safety benefits of the turf grass use according of the invention, airport turf grass management systems according to the invention will bring tremendous financial savings to the airports. As a result of national economic development and globalization, and a general pattern of public sector subsidization of aviation activity, increase in travel demand and consequent growth in commercial airlines and general aviation has lead to mounting investment needs. A report by R. H. Bates, Airport Financing: Whither (or Wither) the Market?, presented at Airport Operators Council International Economic Specialty Conference, Sacramento, Calif., Mar. 31, 1982, cites the Congressional Office Budget estimates of data of the Federal Aviation Administration, National Airport System Plan Revised Statistics, 1980-1990, National Aviation System Development and Capital Needs for the Decade 1982-1991. The study estimates that airports will have a capital total demand of $450-650 million for large commercial airports; $200-350 million for medium commercial airports; and $400-500 million for small commercial airports. Of that amount, 5% of the demand is required for the maintenance of the airport for large and small airports and 1% for medium airports. Consistent with the FAA's findings, an article in Miami Today by Risa Polansky, entitled, "Yearly airport costs to nearly double in 2015, revenue streams sought" (Jul. 9, 2009), reports that the Miami-Dade Aviation's capital improvements program operations expenses at the Miami International Airport is to face a projected $500 million in new annual costs beginning in 2015. Chief Financial Officer Anne Lee noted that the rising costs are not a surprise to aviation officials, and is not accidental or unusual. Such increasing costs put a burden both on local governments and in turn on the consumer resulting in greater taxes and travel costs to the public.

One intended benefit of a lower growing turf grass for airfield areas is the reduction and frequency of mowing required to maintain those areas. These reductions lead to cost savings in labor and fuel, and reduced wear on maintenance equipment, and reductions in the numbers of necessary heavy equipment, as well as providing environmental benefits such as lower emissions. These economic benefits become more significant as the size of an airport increases and when applied over time. As fuel prices increase, the savings resulting from reduced mowing will also increase.

The advantages to the Federal Aviation Administration from reduced mowing include reduced flush and mutilation of insects and animals in the runway safety areas, which will lower the incidence of bird strikes; fewer weeds/grass species which are known to be wildlife attractants; fewer runway interruptions and closures when mowing is reduced; decreased operational impact—the reduction in mowing increases operational safety and reduction in ground traffic conflicts; and deeper, more extensive root systems resulting in decreased storm water runoff, increased infiltration, and increased soil stabilization.

Though the disclosure herein relates to compositions and methods of the invention directed mainly to airfield turf management, it will be apparent to those skilled in the art that the invention is equally applicable to compositions and methods of improved turf management of roadsides, utility transmission corridor rights-of-way, golf courses, parks, lawns, campuses and any and all other low traffic areas where low maintenance, short turf grass and wildlife control are desirable.

The advantages of the invention are demonstrated by the examples below. The following examples are set forth to illustrate the composition and methods of the invention and are intended to be purely exemplary of the use of the invention and should not be viewed as limiting in its scope.

EXAMPLES

In 2009, the City of Philadelphia Division of Aviation (DOA) began a study at the Northeast Philadelphia Airport (PNE) to test the viability of the compositions of the invention. Beginning with successfully grown landside plots, the ultimate goal of the study was to determine whether the seed mix would thrive on the harsh conditions of the airfield as well as help to deter wildlife. Two airfield experimental plots, each about 1.25 acres in size, were seeded on Oct. 13, 2010. These plots were mowed just one time on Jun. 8, 2011, within the 16 month period. Two control plots consisted of existing airfield turf grass.

On the fine fescue plots, it was recorded that the turf grass blades achieved an average height of 6 inches in the experimental plots. Wispy seed heads developed over a short time span of two to three weeks in May to June, shooting up above the grass blades to as tall as 21 inches when cut to a height of 5 inches. The grass formed a dense sod except for a few areas impacted by the one annual mow, which occurred on a sunny day with temperatures exceeding 100° F. and followed by a prolonged period of drought. Approximately 30% of the experimental plots were reseeded on Oct. 24, 2011 and have since filled in. Otherwise, the grass was found to be sun and drought resistant. No fertilization was added. The plots received no irrigation. No disease was noted, and the grass resisted weed encroachment well for a new installation. The plots were treated once for broadleaf weeds and foxtail/crabgrass during the 16 month period on Aug. 30, 2011.

The following seed mixtures were some examples of the compositions of the invention planted and tested at various plots on the PNE airfield. The seeding rate per acre was 220 pounds.

Seed mix #1: Hard fescue (one or more straight species and/or cultivars) at 50% to 100% of the seed mix by weight; Chewings Fescue (one or more straight species and/or cultivars) may be 0% to 50% of the seed mix by weight; Creeping Red Fescue (one or more straight species and/or cultivars) may be 0% to 50% of the seed mix by weight. Minimum purity=98%; Minimum germination=85%; Maximum weed seed=0.15%;

Seed mix #2: Hard fescue (one or more straight species and/or cultivars) is 33.4% of the seed mix by weight; Chewings fescue (one or more straight species and/or cultivars) is 33.3% of the seed mix by weight; Creeping red fescue (one or more straight species and/or cultivars) is 33.3% of the seed mix by weight. Minimum purity=98%; Minimum germination=85%; Maximum weed seed=0.15%;

Seed mix #3: Chewings fescue (one or more straight species and/or cultivars) is 100% of the mix. Minimum purity=98%; Minimum germination=85%; Maximum weed seed=0.15%;

Seed mix #4: Creeping red fescue (one or more straight species and/or cultivars) is 100% of the mix. Minimum purity=98%; Minimum germination=85%; Maximum weed seed=0.15%;

Seed mix #5: Approximately 25% Firefly Hard fescue, 25% Aurora Gold Fescue, 25% Intrigue Chewings Fescue, and 25% Edgewood Creeping Red Fescue Minimum purity=98%; Minimum germination=85%; Maximum weed seed=0.15%;

Seed mix #6: Slender Creeping Red Fescue (one or more straight species and/or cultivars) is 100% of the mix. Minimum purity=98%; Minimum germination=85%; Maximum weed seed=0.15%;

Seed mix #7: Hard fescue (one or more straight species and/or cultivars) at 0% to 100% of the seed mix by weight; Chewings fescue (one or more straight species and/or cultivars) at 0% to 100% of the seed mix by weight; Creeping red fescue (one or more straight species and/or cultivars) at 0% to 100% of the seed mix by weight; Slender creeping red fescue (one or more straight species and/or cultivars) at 0% to 100% of the seed mix by weight. Minimum purity=98%; Minimum germination=85%; Maximum weed seed=0.15%;

Seed mix #8: Hard fescue (one or more straight species and/or cultivars) is 100% of the mix. Minimum purity=98%; Minimum germination=85%; Maximum weed seed=0.15%;

During the first step of the process, an herbicide was applied to kill the existing turf grass on the airfield test plots. The dead turf grass was left to remain on the plots so as to prevent any erosion of the soil. No earth disturbance was caused by the project. In the second step, after a period of approximately 14 days, the test plots were drilled or slit seeded according to the protocol of the Philadelphia Northeast Airport with varying seed blends and mix compositions of the invention on six different plots as follows:

Example 1

"A" represents the airfield experimental turf grass plots of 1.24 acres and 1.31 acres; plot "AC" represents the airfield control plots of equal size; The precise location of the plots were at latitude N40 04"23.83", longitude W75 00 19.94" (NAD 83).

Soil samples of the test plots were tested by Penn State University. The pH of the soil was found to be more acidic than expected, with a pH of 5.4 and 5.5 (replicated tests), which are considered less than desirable for the grass compositions of the invention. Lime was applied to the test plots to raise the pH to about 6.0. The lime application was pelletized and applied at an approximate rate of 80 lbs. per 1000 square feet, with a composition of 50% dolomite and 50% calcite.

Figure 3:
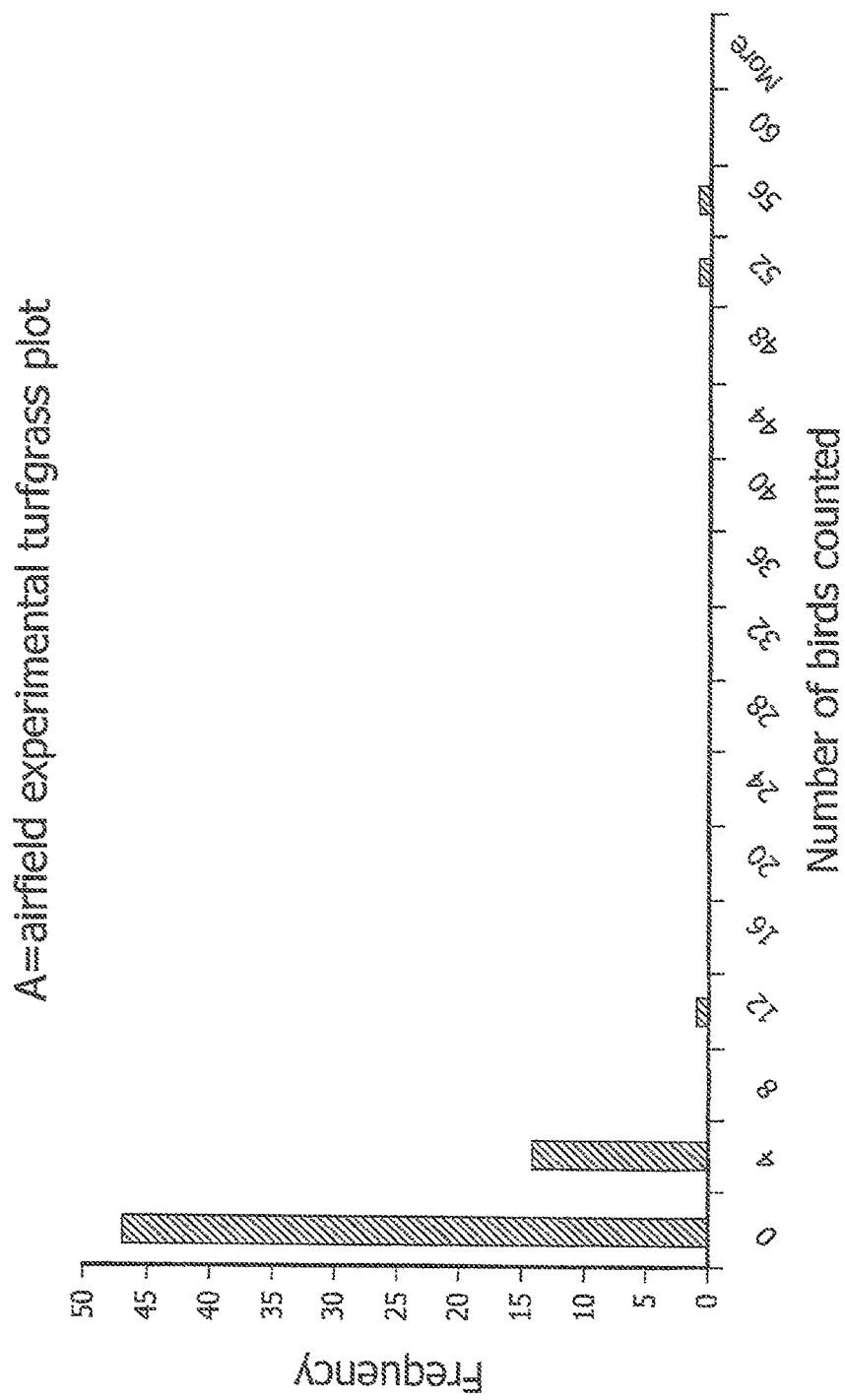
FIG. 3 is a histogram showing the frequency of birds counted on an airfield experimental plot containing the fine fescue grasses planted according to the methods of the invention.
Figure 4:
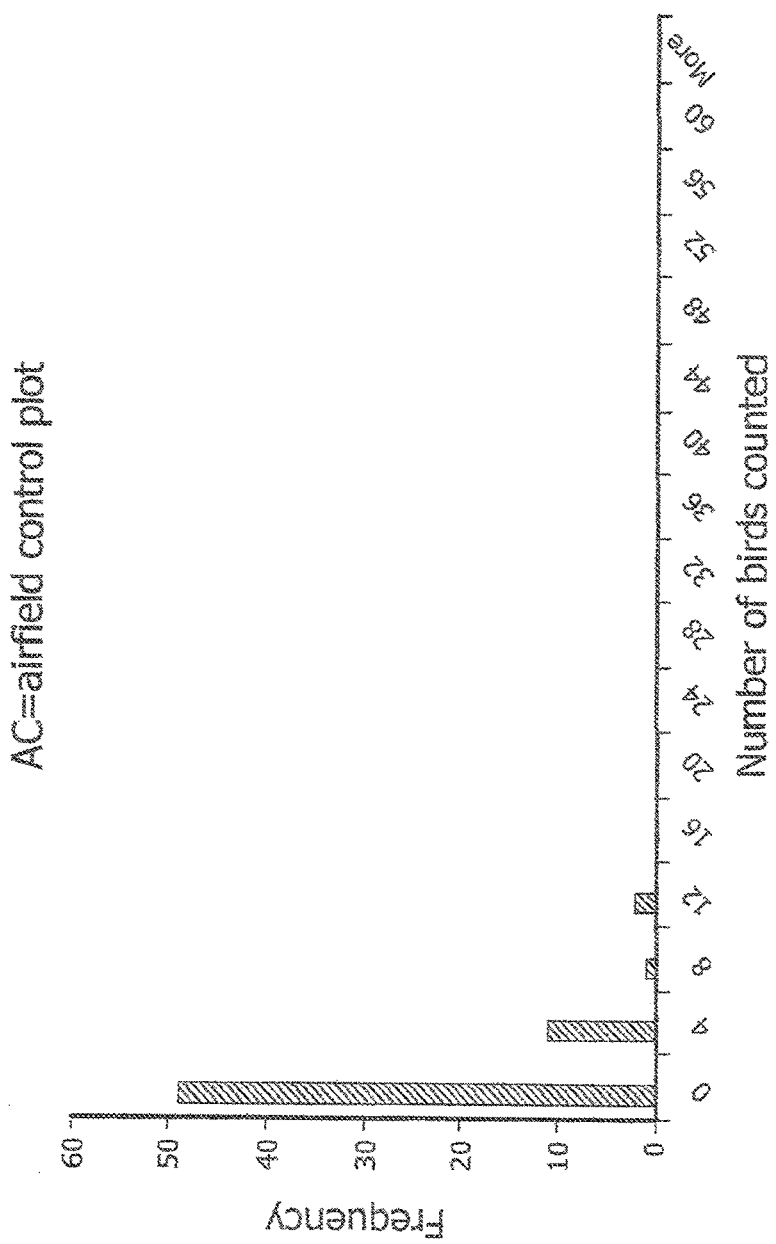
FIG. 4 is a histogram showing the frequency of birds counted on an airfield control plot.

In order to demonstrate the effect of the seed blend and mix compositions on wildlife management and reduction, the study team herein monitored the numbers and species of birds that presented on the plots. Bird activity was counted during 15 minute periods (point counts) and recorded (by species) in biweekly dawn and dusk monitoring of the experimental plots, as well as the control plots. (Mammal and unusual insect activity were recorded on the data sheets, but not included in the point count numbers.) The histograms shown in FIGS. 3 and 4 show the frequency (in multiples of four) of birds observed during these point counts in the respective experimental and control plots. Table 2 sets forth the number of birds counted on each of the plot.

TABLE 2

Philadelphia Northeast Airport Bird

| Date | Time | A | AC |
|---|---|---|---|
| Oct. 27, 2010 | 8:07:00 | 3 | 0 |
| Oct. 27, 2010 | 16:23:00 | 54* | 0 |
| Nov. 10, 2010 | 7:55:00 | 1 | 0 |
| Nov. 10, 2010 | 15:50:00 | 0 | 0 |
| Nov. 24, 2010 | 8:05:00 | 0 | 0 |
| Nov. 24, 2010 | 15:07:00 | 1 | 0 |
| Dec. 08, 2010 | 7:55:00 | 0 | 0 |
| Dec. 08, 2010 | 16:14:00 | 0 | 0 |
| Dec. 22, 2010 | 7:54:00 | 1 | 1 |
| Dec. 22, 2010 | 15:02:00 | 0 | 0 |
| Jan. 05, 2011 | 8:16:00 | 0 | 0 |
| Jan. 05, 2011 | 15:34:00 | 0 | 0 |
| Feb. 09, 2011 | 8:13:00 | 0 | 0 |
| Feb. 09, 2011 | 15:04:00 | 0 | 0 |
| Feb. 23, 2011 | 8:09:00 | 0 | 0 |
| Feb. 23, 2011 | 15:10:00 | 1 | 0 |
| Mar. 09, 2011 | 8:02:00 | 0 | 0 |
| Mar. 09, 2011 | 14:58:00 | 0 | 0 |
| Mar. 23, 2011 | 8:04:00 | 0 | 0 |
| Mar. 23, 2011 | 15:02:00 | 52** | 12** |
| Apr. 06, 2011 | 7:54:00 | 3 | 0 |

TABLE 2-continued

Philadelphia Northeast Airport Bird

| Date | Time | A | AC |
|---|---|---|---|
| Apr. 06, 2011 | 15:00:00 | 4 | 0 |
| Apr. 20, 2011 | 7:51:00 | 0 | 0 |
| Apr. 20, 2011 | 15:08:00 | 0 | 0 |
| May 12, 2011 | 9:53:00 | 2 | 1 |
| May 12, 2011 | 15:46:00 | 2 | 0 |
| May 25, 2011 | 7:55:00 | 3 | 9 |
| May 25, 2011 | 15:00:00 | 0 | 1 |
| Jun. 08, 2011 | 7:55:00 | 1 | 0 |
| Jun. 08, 2011 | 15:34:00 | 0 | 0 |
| Jun. 22, 2011 | 8:10:00 | 0 | 0 |
| Jun. 22, 2011 | 16:03:00 | 0 | 0 |
| Jul. 06, 2011 | 8:01:00 | 10 | 1 |
| Jul. 06, 2011 | 16:08:00 | 2 | 0 |
| Jul. 20, 2011 | 8:05:00 | 1 | 1 |
| Jul. 20, 2011 | 15:58:00 | 0 | 2 |
| Aug. 03, 2011 | 7:11:00 | 0 | 0 |
| Aug. 03, 2011 | 19:11:00 | 0 | 0 |
| Aug. 17, 2011 | 7:17:00 | 2 | 4 |
| Aug. 17, 2011 | 18:05:00 | 0 | 0 |
| Aug. 31, 2020 | 6:37 | 0 | 0 |
| Aug. 31, 2011 | 17:37 | 0 | 0 |
| Sep. 12, 2011 | 19:05 | 0 | 1 |
| Sep. 13, 2011 | 6:38 | 0 | 0 |
| Sep. 28, 2011 | 8:22 | 0 | 0 |
| Sep. 28, 2011 | 15:43 | 0 | 1 |
| Oct. 12, 2011 | 7:50 | 0 | 0 |
| Oct. 12, 2011 | 15:38 | 0 | 0 |
| Oct. 26, 2011 | 7:43 | 0 | 0 |
| Oct. 26, 2011 | 15:48 | 0 | 1 |
| Nov. 09, 2011 | 8:00 | 0 | 0 |
| Nov. 09, 2011 | 15:40 | 0 | 0 |
| Nov. 22, 2011 | 9:41 | 0 | 0 |
| Nov. 22, 2011 | 15:30 | 0 | 5 |
| Dec. 07, 2011 | 8:03 | 0 | 0 |
| Dec. 07, 2011 | 15:35 | 0 | 0 |
| Dec. 20, 2011 | 8:25 | 0 | 0 |
| Dec. 20, 2011 | 15:12 | 0 | 0 |
| Jan. 05, 2012 | 8:12 | 0 | 0 |
| Jan. 05, 2012 | 15:11 | 0 | 0 |
| Jan. 18, 2012 | 8:13 | 0 | 1 |
| Jan. 18, 2012 | 15:07 | 0 | 0 |
| Feb. 01, 2012 | 8:14 | 0 | 0 |
| Feb. 01, 2012 | 15:17 | 0 | 0 |

Data: A = airfield experimental turf grass plot; AC = airfield control plot

*It is believed that the high count of mostly European Starling birds on Oct. 27, 2010 on plot "A" was due to the initial soil disturbance of the recent seeding on the first day of the study and was anticipated.

**It is believed that the high count of birds on Mar. 23, 2011 on plot "A" was due to Ring-billed Gulls feeding on large number of earthworms surfacing on the airfield and paved surfaces after heavy rains over the previous week. Immediately prior to the point count period, more gulls were found on the airfield control plot.

For each plot, it was calculated that the median and mean number of birds were as set forth in Table 3 as follows:

TABLE 3

|  | A | AC |
|---|---|---|
| Median | 0 | 0 |
| Mean* | 0.48 | 0.45 |

*Calculated by removing the outlier counts of 54 and 52 on A and 12 on AC.

As seen from the graphs, the Department of Aviation study proved successful, the lower turf grass required mowing only once per year, resulting in a tremendous reduction of effort and expense in mowing the airfield, which today at PNE is estimated to be mowed between 17 to 22 during the course of a season (from April through November.) By comparison, the airfield control turf grass not only needed to be mowed as usual, but had high weed composition measuring in places up to 16 inches between mowings.

The study showed the effects on bird deterrence on the airfield plots containing the seed blends and mixes of the invention. Removing the two instances of higher bird counts because the occurrences were unrelated to the experimental grass, the mean averages drop to less-than-one bird in the experimental plot (A) and to less-than-one bird in the control plot (AC). The data demonstrates the experimental plots did not attract more birds than the control plots. This result was obtained even though the experimental plots were mowed just once a year, while the control plots received regular mowing throughout the growing season, having been mowed 17 times. In fact, the landside plot data shows a significant reduction in wildlife as the plot matures into a monoculture through the invention's method of selective herbicide control and carefully timed annual mowing. It is anticipated that as the experimental grass matures into thicker stands, there will be increasing reductions in wildlife. Immature stands of new grass, with more bare dirt areas exposed, are commonly subject to higher numbers of wildlife.

Interviews were conducted with companies that perform commercial large-scale turf-grass installations. Estimates for the cost of mowing were noted to range from $600 to $1800 per acre per year, depending on location, conditions, and number of mowings per year. As part of the research effort, general data and estimates of current Philadelphia Division of Aviation (DOA) maintenance practices were collected for comparison to maintenance efforts required for the airfield turf grasses of the invention. The cost of the initial planting of a traditional turf grass seed mix used in the analysis varies depending on total acreage, construction phasing, the contractor performing the work, and other factors. For purposes of the analysis, a unit price per acre was selected based on a review of historic airport bid prices for seeding. Costs of the initial planting of the turf grass seeds of the invention were provided by Native Return, LLC, of Lafayette Hill, Pa. In general, the cost for the traditional seeding was on a similar order of magnitude as the cost for the seeding of the invention, and any variances from one to the other were relatively inconsequential over the long term aspect of the analysis.

Specifically, the cost-benefit analysis was calculated for the airfields of Northeast Philadelphia Airport (PNE) and the Philadelphia International Airport (PHL). Table 4 sets forth the planting and maintenance costs for the compositions of the invention comprising the fine fescue grasses of the invention. It was demonstrated over the course of the study that a significant reduction in mowing effort from the current practice of an estimated 22 mows per year at PHL, or an estimated 17 mows per year at PNE, is possible.

TABLE 4

Planting and Maintenance Costs for Compositions of the Invention

| ITEM | CURRENT PRACTICE WITH TRADITIONAL AIRFIELD TURF GRASS (in 2010 dollars) | | PROPOSED PRACTICE WITH ALTERNATIVE AIRFIELD TURF GRASS (in 2010 dollars) | | NET CHANGE | |
|---|---|---|---|---|---|---|
| *Initial Planting* | | | | | | |
| For any sizable acreage | $1500/acre [1,"] | | $1560/acre [1,3] | | negligible | |
| *Estimated Frequency of Upfront Maintenance To Establish Turf Grass (within first year)* | | | | | | |
| Broadcast Spraying of Invasives | Not performed | | 1 application/year (only in first 1 or 2 years) | | 1 application/year (only in first 1 or 2 years) | |
| Overseeding• | Not performed | | 1 application in first year estimated at equivalent of 20%[5] rate of initial planting | | 1 application in first year estimated at equivalent of 20%[5] rate of initial planting | |
| *Estimated Cost Per Upfront Maintenance Occurrence to Establish Turf Grass (within first year)* | | | | | | |
| Broadcast Spraying of Invasives | Not applicable | | $100/acre [1,3] | | $100/acre | |
| Overseeding | Not aoolicable | | $312/acre';j | | $312/acre | |
| Total Upfront Maintenance . Cost (per acre) | Not applicable | | $412/acre | | $412/acre new cost | |
| *Estimated Frequency of Annual Maintenance* | | | | | | |
| Fertilizing | Not performed/required | | Not required | | — | |
| Mowing [0]., | PHL 22 mows/year | PNE 17 mows/vear | I mow/year | | PHL - 21 mows/year | PNE - 16 mows/year |
| *Estimated Cost Per Annual Maintenance Occurrence* | | | | | | |
| Fertilizing | $0/acre | | $0/acre | | $0/acre | |
| Mowing" | $38/acre | $25/acre | $38/acre | $25/acre | | |
| Total Annual Maintenance Cost (per acre) | $836/acre | $425/acre | $38/acre | $25/acre | $798/acre savings | $400/acre savings |
| Total Airfield Acreage (provided by DOA) | PHL 870.4 | PNE 763.88 | PHL 870.4 | PNE 763.88 | PHL — | PNE — |
| Total Initial Planting Cost (for entire airfield) | $1,305,600 | $1,145,820 | $1,357,824 | $1,191,653 | $1,357,824 | $1,191,653 |
| Total Upfront Maintenance Cost (for entire airfield) | $0 | $0 | $358,605 | $314,719 | $358,605 | $314,719 |
| Total Cost of Initial Planting and Upfront | $1,305,600 | $1,145,820 | $1,716,429 | $1,506,372 | $410,829 additional | $360,552 additional |

TABLE 4-continued

Planting and Maintenance Costs for Compositions of the Invention

| ITEM | CURRENT PRACTICE WITH TRADITIONAL AIRFIELD TURF GRASS (in 2010 dollars) | | PROPOSED PRACTICE WITH ALTERNATIVE AIRFIELD TURF GRASS (in 2010 dollars) | | NET CHANGE | |
|---|---|---|---|---|---|---|
| Maintenance (for entire airfield) | | | | | cost | cost |
| Total Annual Maintenance Cost (mowing for entire airfield) | $727,654 | $324,649 | $33,075 | $19,097 | $694,579 annual savings | $305,552 annual savings |

[1] Including labor, equipment, and materials.
[2] Based on historic bid prices. Prices can vary greatly depending on scope of project. In general, the price difference as compared with the lower growing alternative turf grass is relatively negligible considering the long term cost savings.
[3] Provided by Native Return, LLC. Does not include cost of one mowing between killing of existing grass and seeding of meadow in the case of replacing existing turf grass.
[4] Over-seeding recommended within first year to cover bare spots and counteract any invasive weeds; estimated at equivalent of 20% of initial planting rate for purposes of benefit-cost analysis.
[5] Provided by Native Return, LLC.
[6] Frequency and cost per acre of current mowing practices at PHL and PNE based on data provided by DOA.
[7] To maintain growth within FAA criteria per FAA Advisory Circular FAA AC 150/5200-33B, Hazardous Wildlife Attractants On or Near Airports.

Based on the cost-benefit analysis, it was calculated that annual reductions in maintenance costs per acre at Northeast Philadelphia Airport (PNE) and Philadelphia International Airport (PHL), would be approximately 95% of what they are today through the reduction in mowing to once per year. Reducing mowing to a once annual event by utilizing the compositions according to the invention will save the Philadelphia Division of Aviation in mowing expenses alone, a combined amount of approximately $727,655.00 (in 2010 dollars) per year at Philadelphia International Airport (PHL) and $324,649.00 per year at Northeast Philadelphia Airport; which translates to a total savings over ten years (in 2010 dollars) of $7.3 million at PHL and $3.2 at PNE resulting in a savings of $10.5 million for the Philadelphia Division of Aviation for the two airports combined. It is also noteworthy that this calculation does not include the additional potential reduction in wildlife management expenses and runway interruptions.

In addition to reduction mowing costs, fewer mowing events result in fewer runway interruptions, lower operational impact (with the reduction in mowing operations there will be a reduction in ground traffic conflicts), and fewer costs associated with anticipated wildlife strikes (mowing flushes and mutilated animals, birds and insects) as well as reduced wildlife management expenses.

Another benefit of the methods of the invention is the reduction of gas emissions. Given that the airfield turf grass of the invention requires only one mow per season, compared to the current average 22 mows, replacing current airfield turf grass would ultimately reduce emissions from mowing operations to at least 1/21 of current practice, or a reduction of 95% as illustrated in Table 6. As part of the study of the Example herein, the United States Environmental Protection Agency's NONROAD model was used to calculate estimated pollutant emissions from current mowing equipment operations at the Philadelphia International Airport (PHL) and the Northeast Philadelphia Airport (PNE).

Table 5 presents current estimated mowing emissions at PHL and PNE.

TABLE 5

Summary of Estimated Pollutant Emissions (Tons/Year)

| | VOC | NOx | CO | SO$_2$ | PM$_{10}$ | PM$_{2.5}$ |
|---|---|---|---|---|---|---|
| PHL | | | | | | |
| Current operations | .70 | .84 | 19.93 | .03 | .01 | .01 |
| Projected with slower growing turf | .03 | .04 | .95 | <.01 | <.01 | <.01 |
| PNE | | | | | | |
| Current operations | .57 | .11 | 15.93 | .02 | .01 | .01 |
| Projected with slower growing turf grass | .03 | .03 | .76 | <.01 | <.01 | <.01 |
| Overall Estimated % Reduction | | | 95% | | | |

Source: United States Environmental Protection Agency (EPA) NONROAD Model

Example 2

An additional study was performed on a 0.17 acres landside experimental plot centered within the existing mowed grass control plot. Concurrent to the airfield study, the landside plot, one year more mature than the airfield plots, was included in the experiment and was monitored (for same above parameters) throughout its second year. The plot was seeded with the turf grass according to the invention on Sep. 18, 2009. The plot was mowed once per year—on Jun. 10, 2010 and on Jun. 22, 2011. The turf grass achieved an average height of 6 inches prior to mowing. It formed a dense sod except for one four-foot square area where crabgrass encroached. The plot was spot-treated for crabgrass and the spot was reseeded Oct. 24, 2011. It has since filled in. The grass was found to be sun and drought resistant. No fertilization was necessary. No irrigation was necessary. No disease was noted, and the grass resisted weed encroachment well for a new installation. It was spot treated once per year for scattered (infrequent) broadleaf weeds and crabgrass during the 28 month period.

Bird activity was counted during 15 minute periods (point counts) and recorded by species in biweekly dawn and dusk monitoring of the experimental plots, as well as the control plot. The data demonstrates that the experimental plot did not attract more birds than the control plot. This occurred even though the experimental plot was mowed just once a year, while the control plot received regular mowing throughout the growing season (17 mows.) Although the landside plot was not replicated, it was noted through regular observation that birds entering the experimental turf grass plot, located within the control plot, would quickly exit the experimental grass plot. There were, at various times, many birds feeding in the mowed turf grass control plot surrounding the experimental turf grass plot, yet few if any within the experimental plot. It was noted that when the birds would enter the experimental plot, they would not linger, and instead relocate to continue feeding in the control plot area.

The numbers of grasshoppers was fewer in the experimental plots compared to the control plots. This was determined anecdotally by observing a great reduction in the numbers of flushed grasshoppers when walking through the plots of the invention compared to the control plots in August and September. Grasshoppers are a known major wildlife attractant to foxes, skunks, ground squirrels, moles, shrews, mice, pheasants, quail, crows, owls, sharp-shinned hawks, kestrels, cooper's hawks, herons and many song birds feed on them, as well as turkeys, frogs, toads, and lizards.

Example 3

Set forth in this Example 3 is a suggested seeding specification that can be utilized to grow the grass according to the invention herein on a plot having existing vegetation thereon. (For new construction sites, generally over one-half acre, hydro-seeding per industry standard practices, except as described earlier, is the preferred method.)

Step 1—Soil Samples. The first step is to pull 6 to 12 soil samples to a depth of 5 inches throughout the site. The soil samples are combined together and sent to a soil testing lab. The soil lab will send back the results of the test and recommendations in the establishment of the seed.

Step 2—Herbicides. After green-up, and when existing vegetation is actively growing, an application of glyphosate should be applied to control all growth, following the labeling instructions. A second application may have to be applied to control all perennial and annual weeds.

Step 3—Drill Seeding. Approximately fourteen days after Step 2, the site can be seeded. A vibrating seed slicer is preferably used. The unit should have seed slits with less than 4-inch centers. Two cross patterns should preferably be done for best coverage. Approximately half the seed rate should be sliced in each pattern. This cross pattern method will help eliminate seeding skips. All areas around ground obstructions should be hand ruffed up and hand seeded at the seeding rates set forth hereinabove.

Acceptable seeding methods include hand seeding (small areas); push-type spreader; hand-cranked whirlybird-type seeder; turf slit-seeder; tractor mounted broadcast seeder, such as a "Brillion" seeder; tractor mounted slit seeder; and hydro-seeder. When seeding by hand, with a push-type spreader, or whirlybird seeder, the seed should be raked into the soil lightly and then rolled to ensure firm seed to soil contact.

Step 4—Soil Amendments. After Step 3 is complete, any soil amendment should be broadcast over the area. Care should be taken and all soil amendments should be applied also in preferably two or more cross patterns for best coverage. Preferably slow release blended fertilizer should be used.

The environmental benefits to airports as a result of the use of the compositions and methods of the invention are incalculable, including protection of human life and wildlife; reduced gas emissions from decreased mowing, decreased storm water runoff due to deeper and larger root systems of vegetative cover, increased soil stabilization, moderation of airport temperatures and heat effects to the atmosphere, and tremendous financial savings to the aviation industry and consequently to the public.

The particular embodiments described herein is provided by way of example and is not meant in any way to limit the scope of the claimed invention. It is understood that the invention is not limited to the disclosed embodiments, but on the contrary, is intended to cover various modifications and equivalent arrangements included within the spirit and scope of the appended claims. Without further elaboration, the foregoing will so fully illustrate the invention, that others may by current or future knowledge, readily adapt the same for use under the various conditions of service.

What is claimed is:

1. A lawn seed mixture that produces grasses which wildlife are more likely to avoid, said mixture consisting essentially of:
    (a) one third by weight Hard Fescue;
    (b) one third by weight Creeping Red Fescue; and
    (c) one third by weight Chewing Fescue, said lawn seed mixture, when planted at a rate greater than about 220 lb. per acre, produces grasses with a deep and large root system which wildlife are more likely to avoid.

2. The lawn seed mixture of claim 1 wherein the Creeping Red Fescue consists essentially of Slender Creeping Red Fescue.

3. The lawn seed mixture of claim 1, which includes seed mixtures having high endophytic activity.

4. The lawn seed mixture of claim 1, which is substantially free of sheep fescue.

5. The lawn seed mixture of claim 1, which is substantially free of bluegrass or ryegrass seeds.

6. The lawn seed mixture of claim 1, which grows well in soils with a pH between about 5.0 and 8.0.

7. The lawn seed mixture of claim 1, which grows well in soils with a pH between about 5.5 and 6.4.

8. The lawn seed mixture of claim 1, which produces grasses that requires one or more of the following properties:
    little to no mowing;
    little to no irrigation; and
    little to no fertilizer.

9. The lawn seed mixture of claim 1 that is suitable for use on one or more areas selected from the group consisting of:
    airfield turf, roadsides, utility transmission corridor rights-of-way, golf courses, cemeteries, parks, lawns and campuses.

10. A lawn seed mixture that is capable of producing wildlife resistant grasses in full sun, said mixture consisting essentially of one or more fine fescues selected from the group consisting of:
    one third by weight of one or more blends of hard fescues;
    one third by weight of one or more blends of creeping and/or slender creeping red fescues; and
    one third by weight of one or more blends of chewings fescues, and combinations thereof, said lawn seed mixture, when planted at a rate greater than about 220 lb. per acre, produces grasses in full sun which grasses wildlife are more likely to avoid.

11. The lawn seed mixture of claim 10 that is suitable for use on one or more areas selected from the group consisting of:

airfield turf, roadsides, utility transmission corridor rights-of-way, golf courses, cemeteries, parks, lawns and campuses.

12. An airfield turf lawn seed mixture that is capable of producing wildlife resistant grasses in full sun, said mixture consisting essentially of one or more fine fescues selected from the group consisting of:
  one third by weight of one or more blends of hard fescues;
  one third by weight of one or more blends of creeping and/or slender creeping red fescues; and
  one third by weight of one or more blends of chewings fescues.

* * * * *